Patented Aug. 25, 1931

1,820,862

UNITED STATES PATENT OFFICE

ALFONS HENRY NEULAND, OF IRVINGTON, NEW JERSEY, ASSIGNOR TO ELECTRO-MOBILE CORPORATION, OF IRVINGTON, NEW JERSEY

ELECTRIC SYSTEM FOR VEHICLES

Application filed July 24, 1928. Serial No. 294,993.

This invention relates in general to improved methods and means for electromagnetically transmitting power from a prime mover to a load.

In my copending application Serial #219,226 filed September 13, 1927 for automatic power transmission I disclosed an apparatus and control means for transmitting power which is particularly adapted for use in the type of apparatus in which a dynamo is rotatively associated with a power shaft and a load shaft by suitable mechanical connections and cooperates with another dynamo to transmit power between the shafts.

In my copending application Serial #219,226 filed September 13, 1927, I have disclosed a system for controlling such dynamos.

One of the principal objects of the present invention is to provide improved means for controlling the dynamos and to provide a system in which a regulating dynamo is also capable of charging a storage battery and of operating the ignition system, lights and signaling devices on the vehicle.

Still another object of my invention is to provide a complete electric system for motor vehicles including transmission of power, starting, electric braking and battery charging; to regulate the engine speed automatically and by means of the engine throttle and to provide methods and means for safely controlling the engine and the vehicle.

Further objects of the invention are to secure the manifold functions with relatively few and simple devices of moderate size and good efficiency cooperating with one another.

Still further objects and advantages of my system will appear from the following description.

I provide the clutch dynamo with a series field coil of relatively many turns and the booster dynamo also with a series coil but of relatively few turns. I also provide the booster with a shunt coil receiving current from the clutch when underspeeding, from the booster when overspeeding and from a regulating dynamo especially during the transition period when the propeller shaft passes thru synchronism that is when the relative direction of rotation of propeller shaft reverses with respect to engine shaft. I provide a regulating dynamo which is electrically tied with the auxiliary devices on the vehicle such as battery, lights and signaling devices to which it supplies current at relatively low and constant potential when the engine has reached the required speed. I provide a connection between the battery and shunt booster field coil for the flow of a small current which serves to reverse the booster flux and to maintain stability and current direction in load circuit particularly when the motor action of booster is varied by throttle manipulations. I also provide a resistance in the booster shunt coil circuit and a switch operated by the accelerator to include or exclude the resistance for the purpose of further varying the engine speed and horse power and particularly for operating the vehicle at its maximum speed.

I also provide a safe method and means to start the engine and to operate the vehicle which includes a two way starting switch normally held in the upper position by a spring and a control switch which has mechanical connection with one or more brakes on the vehicle. The two switches are interconnected in such a way that in order to start engine it is necessary not only to depress starting switch but also to close control switch by applying emergency or service brake. This simultaneously locks the propeller shaft, prevents the vehicle from creeping backwards and permits the clutch to exert a torque on engine shaft. These switches and circuit connections also insure safety as the starting switch when released short circuits the clutch field and prevents the clutch from exerting a torque on propeller until the operator is ready and releases the brakes. This opens the clutch field short circuit and permits torque application to propeller.

Figure 1:
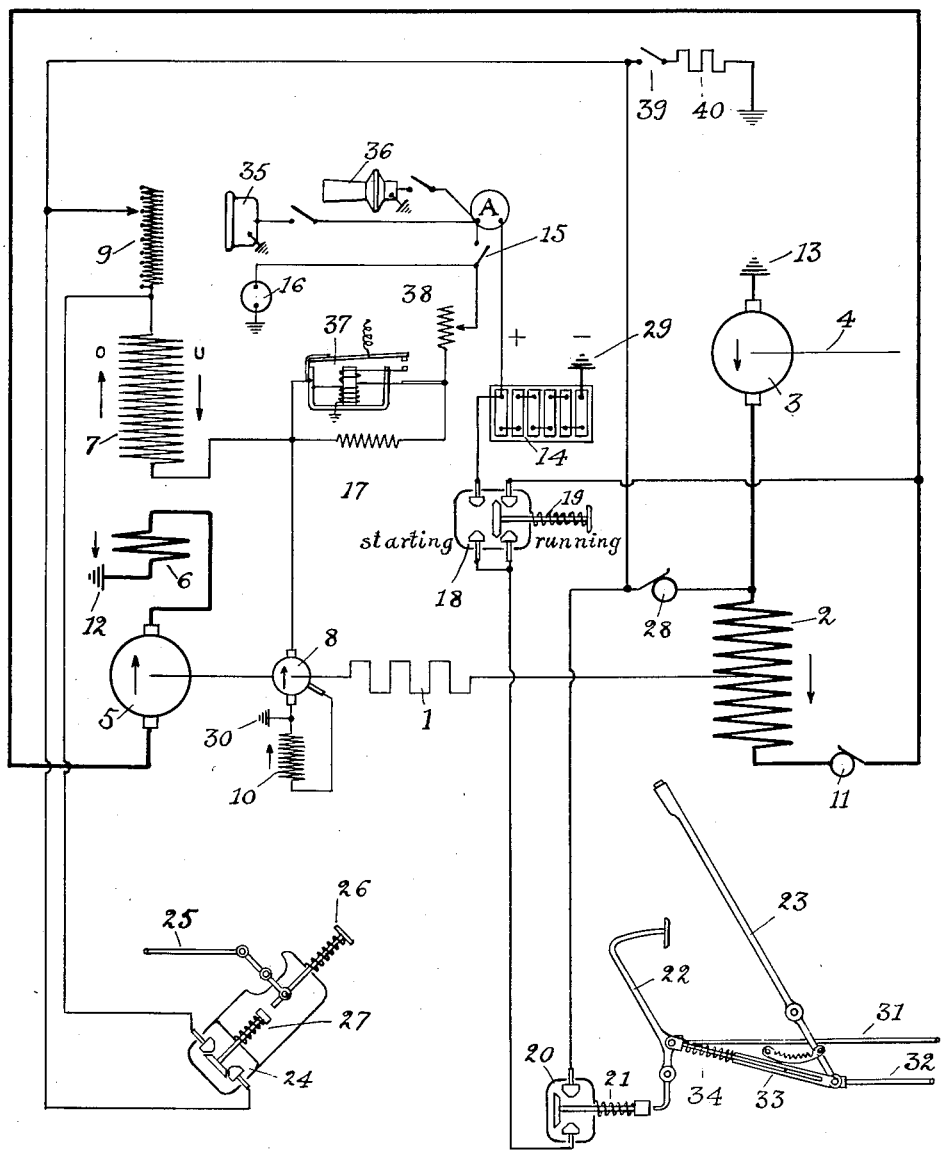
Fig. 1 is a wiring diagram of the system showing schematically the relationship between the electrical and mechanical elements of the system and the engine, propeller, brakes, accelerator and translating devices on the vehicle.

Referring to Fig. 1 the power source or engine on the vehicle is represented by the crankshaft 1 which drives the series field coil 2 mounted on the field system of the clutch dynamo. The clutch armature 3 drives the propeller shaft of the vehicle represented by 4. The booster dynamo has an armature 5 operatively connected to crank shaft and is provided with a series coil 6 having relatively few turns with respect to the series field coil of the clutch dynamo. The load circuit is represented by the heavy line and when underspeeding current from clutch armature 3 flows thru field coil 2 slip ring 11 to booster armature 5 thru series coil 6 in reverse direction to ground connections 12 and 13 back to armature 3. The booster is also provided with a shunt coil 7, connected to the clutch and booster, to receive a relatively small current from the former when propeller shaft underspeeds engine and from the latter when propeller overspeeds.

A small regulating dynamo is also provided having its armature 8 operatively connected to the engine shaft and electrically connected in series with the booster shunt coil 7 thru a ratio changing rheostat 9. The regulating dynamo is of the self excited type its field coil 10 receiving current from a third brush.

A battery 14, customary to motor vehicles is provided and due to the nature of my system it may have a standard number of cells, preferably six cells the number shown in the drawings. Closing of the ignition switch 15 supplies current to the ignition coil 16 and also establishes connection between battery and shunt coil 7 thru resistance 17 and thereby circulating a small current thru coil 7 the purpose of which will be explained later. The batter is also connected to a special starting switch which is normally held in the running position by the spring 19 short-circuiting the clutch field 2 thru the control switch 20 when held in a closed position by the spring 21. The control switch 20 is operated by the movement of the service brake pedal 22 and the emergency brake lever 23 in such a way that the control switch is closed when the pedal is depressed or the lever is set for reasons which will hereafter be described.

I provide an additional switch 24 operated by the movement of the accelerator on the vehicle which has the customary rod connection 25 to carburetor, not shown, operated from the button 26. This accelerator switch is connected across the rheostat or resistance 9 in the booster shunt coil circuit and is normally held closed by the spring 27 short-circuiting the resistance 9. The accelerator is adjusted to permit a wide range of carburetor control and to open switch 24 only when accelerator is depressed beyond a fixed point.

The system provides for normally automatic operation of the vehicle and relieves the operator of much manipulation and exercise of skill essential with other electric or mechanical control systems. This makes for greater safety in the operation of the vehicle.

The operation is as follows: When the operator depresses the starting switch 18 to starting position in order to start the engine current from the battery to the clutch and booster dynamos cannot flow if the operator has forgotten to apply either of the brakes 22 or 23. He is compelled to apply the brake and lock the vehicle. By so doing he closes control switch 20 and the battery circuit. Current from the battery flows thru switches 18 and 20 and thru slip ring 28 where it divides a portion flowing thru armature 3 to grounds 13 and 29 back to battery. The other portion of battery current traverses clutch field 2, booster armature 5 series coil 6 in reverse direction, to grounds 12 and 29 back to battery 14. As stated the brake is locked and so is the armature 3 enabling it to spin the field system and the engine shaft 1 connected thereto in the proper direction, closing of the ignition switch 15 then sets the engine in operation. The direction of current flow thru the booster armature and series field is such that the torque developed by it is in the direction of engine rotation aiding in starting it from rest. Still another circuit is established beginning with the connection near slip ring 28 from which current flows thru booster coil 7, regulator armature 8, to grounds 30 and 29 back to battery. This current thru coil 7 is in direction of arrow U; it serves to strengthen the booster motoring flux and further enhance the starting torque. As the engine turns over the booster armature develops a counter potential and being connected in the clutch field circuit, weakens the latter and increases the starting speed. It is seen that in my system the armatures and all field coils of both dynamos are efficiently cooperating for the production of a vigorous starting torque at first and a substantial starting speed later, enabling me to use a standard battery of moderate size and voltage.

The operator, having started his engine, permits the starting switch to resume its normal or running position which immediately short circuits the clutch field and prevents torque transfer to propeller 4 and vehicle wheels. When at the wheel he maintains the clutch ineffective by depressing the pedal 22, which also enables him to hold the vehicle by applying the brakes not shown thru the rod connection 31, and when he wishes to leave the wheel in order to make adjustments while engine is running or for other reasons he is forced to set the emergency lever 23 and brakes not shown thru the rod connection 32. By so doing the mechanical connection 33 and spring 34 between the hand and pedal brakes levers forces the pedal 22 over sufficiently to permit switch 20 to close.

The connection 33 and spring 34 between the brakes is adjusted to permit independent operation of the service brake lever 22.

When the operator is ready to start the vehicle he releases the brake, opening switch 20 and clutch field short circuit, the clutch instantly becoming active. It is of great importance that in this condition the application of torque to propeller be not too sudden as this would result in jerky operation and is apt to stall the engine. I accomplish this requirement by the use of a series field coil on the clutch with a relatively greater number of turns per pole and a series field coil on the booster with a relatively lesser number of turns per pole connected in series with each other and with the armatures 3 and 5 to form a series circuit so that the clutch operates as a generator and the booster as a motor so long as the engine speed exceeds that of propeller and while the vehicle is at rest when the throttle is practically closed and the engine develops only sufficient power to turn at an idling speed. At this time the current flow in the main circuit is small on account of the weak clutch field and the counter electromotive force of the booster which, although slight, is sufficient to prevent the current in the circuit from building up. The relatively small torque produced by the booster at present is nevertheless effective in aiding the engine to maintain its idling speed and so to keep it from stalling. It is seen that this equilibrium is automatically established and permits the operator to bring the vehicle to a sudden stop, the engine being automatically prevented from stalling without any attention on his part even though he releases his brake after having come to a stop.

My system provides efficient means for counteracting and preventing surging and reversal of polarity in the main circuit. As heretofore mentioned, closing of the ignition switch simultaneously establishes a flow of current thru the resistance 17 which divides, a part flowing thru the regulator armature 8 in opposition to the arrow to grounds 30 and 29 back to battery. This flow of current is opposed by the generation of potential in armature 8 of direction shown by arrow while engine shaft rotates. Another part of the current thru resistance 17 flows thru coil 7 switch 24 when closed to ring 28, thru clutch series coil 2 in direction of arrow, ring 11 booster armature 5, coil 6 to grounds 12 and 29 back to battery. When engine idles, as stated, the clutch armature 3 generates a potential the armature current flowing in the direction shown by arrow. This potential opposed by the booster as explained is also impressed on the booster shunt coil thru the circuit beginning at armature 3, ring 28 switch 24 when closed, coil 7 in the direction of arrow U resistance 17 switch 15 battery 14 grounds 29 and 13 back to armature 3. From the above it is seen that the direction of current flow in coil 7 is determined by the predominating one of two opposing potentials, current flowing in direction of arrow U when potential due to armature 3 predominates over that of battery 14. The action of this arrangement to prevent current reversal in load circuit being as follows: Before reversal the potential and current in armature 3 will first decrease due to the overpowering counter electromotive force from the booster, causing the battery potential instantly to predominate and to reverse the current flow in coil 7 to direction O producing a magnetomotive force in booster field opposed to that due to series coil 6 thereby diminishing or even reversing the booster flux and electromotive force and counter-acting further decrease or reversal of current flow in main circuit, and at the same time prevents periodic variations in the engine idling speed sometimes referred to as hunting. Whenever current from battery flows thru coil 7 it also traverses clutch coil 2 in the direction of arrow and helps to maintain the clutch field polarity and to further stabilize the system.

The regulating dynamo at this time is also operative to prevent reversal of current in main circuit, current from armature 8 in direction of the arrow flowing to the point of junction with resistance 17 thru the coil 7 in direction of arrow O and as heretofore traced to the booster ground 12 thence to the ground 30 back to regulator armature 8. A lessening of the potential and current from armature 3 causes the potential of armature 8 to predominate and to reverse the current flow in coil 7 and to dampen any tendency for surging or reversal in main circuit which is in this instance further aided by the fact that the engine idling speed slightly increases with a decreasing load current, the increased speed of armature 8 generating a higher potential and sending an increasing current thru coil 7 still further increasing the effectiveness of the dampening action.

The function of the resistance 17 is principally to limit the current flow from the battery thru the regulator armature 8 when the engine is at rest in the event the operator neglects to open ignition switch 15 and may sometimes be dispensed with. The maximum potential of armatures 3 and 5 may be as much as ten or more times greater than that of the battery 14 or regulating armature 8 and consequently the resistance of coil 7 is proportioned to be in keeping with the relatively high maximum potential of armatures 3 and 5 which of itself limits the current from the relatively low potential battery or the regulating armature during the engine idling period without the interposition of a resistance.

While I have shown and described the battery and regulator methods for counteracting surging and hunting during the engine idling period, I wish it understood that one or both methods may be successfully employed depending on the constants of the apparatus and also upon the relationship between the capacity or size of the booster dynamo and the clutch dynamo as well as upon the relative number of series turns in the booster and clutch coils 6 and 2, in general the rule applying that the closer the booster capacity and effective number of series turns approaches the capacity and effective number of series turns of the clutch, the stronger must be the dampening potential and the current thru coil 7 in opposition to that from clutch armature 3 during the engine idling period. Consequently if the booster is sufficiently smaller in size or has a sufficiently smaller number of effective series turns the battery alone may be used for dampening oscillations as described. This however reduces engine torque multiplication which is often objectionable in motor vehicle operation. Good results can be obtained when the booster capacity is between fifty and eighty per cent of the clutch capacity and the effective series turns on booster field are between ten and fifty per cent of those on the clutch field.

Proceeding to the next step in the operation of the system and assuming for the moment that the wheels are locked by some means other than the brakes a full opening of throttle will speed up the engine to about five or six hundred R. P. M., the full throttle engine speed depending on the size of clutch and booster with relation to engine torque. The current in load circuit as also the torque on the propeller shaft now build up to the maximum value. The maximum torque on propeller shaft transmitted by the clutch at this time is equal to that produced by the engine plus the torque exerted by the motoring action of the booster. At this stage in the operation of the system it should be noted that given an engine of limited torque the production of the required maximum propeller torque is again governed by the relationship between armature conductors and flux of booster and the clutch and that the clutch should be designed to transmit the maximum required propeller torque and the booster to develop the difference between the propeller and engine torques. Furthermore the electrical units must be of such size that their losses, especially due to the heavy current in the load circuit, do not exceed the power which the engine can develop at the relatively low speed to which it is limited with the vehicle wheels locked.

The voltage of clutch armature 3 at this time greatly exceeds and is opposed to that of regulator armature 8; this causes current to flow from armature 3 ring 28 switch 24 when closed thru the booster coil 7 armature 8 reversely to the arrow, grounds 30 and 13 back to armature 3 the direction thru coil 7 being as shown by arrow U and the same as the load current in coil 6, the two windings cooperating to produce a powerful booster field. I wish to point out that the compounding action of booster coil 7 during this period of operation is very desirable, it permits the production of the required booster field and torque with a lesser number of turns in the series coil 6 which is advantageous not only in stabilizing the load current during the engine idling period but also reduces the size and weight of booster field system as well as its losses.

When the vehicle wheels are unlocked a full opening of throttle will immediately set the vehicle in motion, the engine automatically speeds up and due to the increased power developed maintains a powerful torque at the propeller shaft during the acceleration period. The increasing engine speed causes the potential from regulator armature 8 also to increase in opposition to that of armature 3 and to progressively decrease the current in coil 7 as otherwise the booster counter potential may increase at a faster rate than the clutch potential threatening to or actually reversing the load current as the engine speeds up. The regulator effectively prevents this, lowers the booster flux and counter potential and prevents the engine from speeding up at a greater rate than the propeller shaft which has the following effect: The relative speed between engine and propeller decreases lowering the potential of armature 3; counter potential of armature 5 also decreases due to decrease of current in coil 7 as well as in coil 6 due to decreasing load current. As engine speed increases still further the changes above described continue until the regulator armature voltage equals that of clutch armature 3 when current flow in coil 7 has ceased. Beyond this point in the engine speed the voltage in armature 8 predominates and reverses the current in coil 7. It now flows in the direction of arrow O and opposes the magnetomotive force due to load coil 6 continuing to increase until the magnetomotive force due to coil 7 equals that of coil 6 when the booster flux and counter potential are zero. At this moment the propeller shaft speed nearly equals that of the engine, the clutch potential having decreased to a point where it is just sufficient to force the load current thru the circuit. As the engine speeds up beyond this point the continually increasing potential and current thru coil 7 from armature 8 now practically unopposed by armature 3, has reversed the booster flux and changed the booster into a generator which at first aids the clutch in energizing the circuit until the propeller speed equals that of the engine when the booster generates just sufficient potential to maintain the load current in the circuit. At the same time the booster armature 5 begins to aid the regulator armature 8 in energizing the coil 7 in the direction of arrow O the circuit being as follows: Current from the regulator armature enters the coil 7 then to switch 24, if closed, ring 28 field 2 armature 5 coil 6 grounds 12 and 30 back to regulator armature 8. A still further increase in the engine speed causes the combined voltages in 8 and 5 to build up a strong booster generating field and potential which enables the clutch armature to greatly overspeed the field system and the engine.

It is seen that the clutch armature has passed thru synchronism, that is from underspeeding to overspeeding the engine, that during the transition period current in main circuit has continued to flow in the same direction and that the propeller torque has been uninterrupted. However, the voltage across the clutch and booster armature has automatically reversed as has the flow of electric energy in the main circuit.

From the foregoing it will be understood that during the acceleration period the operator has merely depressed his accelerator thereby building up the propeller to its maximum value and that the continually changing relationship between engine and propeller torque and speed, the transition from underspeeding to overspeeding and stabilization have all been accomplished automatically and without any attention on his part.

My system also provides for automatically varying the engine speed and horsepower delivery for any given vehicle speed in accordance with the requirements of the load that is depending on whether the vehicle is climbing a grade, accelerating or traveling on a level road. Assuming that the vehicle has accelerated to the desired speed on a smooth level road and the operator wishes only to maintain this speed requiring a considerably lesser amount of power I prefer to derive this power at a greatly reduced engine speed for reasons of fuel economy, longer engine life and quieter operation. My system accomplishes this result whether the propeller shaft underspeeds or overspeeds the engine and may best be described as follows: During the overspeeding period if the operator partly releases his throttle, acceleration ceases and propeller load decreases as does the current in the load circuit and particularly in the coils 2 and 6 which weakens the clutch field and lowers its counter electromotive force below that of booster, the booster electromotive force adjusting itself to it by a lowered engine speed. Furthermore the lower current in booster coil 6 results in lesser opposition to the coil 7 and in an increased booster flux and voltage, the latter exceeding that of clutch which would normally tend to increase the load current but, due to the decreased throttle opening and engine torque forces the engine speed down until a balance between the two electromotive forces is established.

When underspeeding a partial throttle closing and lowered load current is accompanied by a weaker clutch field and generated potential a decreased current in coil 7 lower booster flux and counter potential and a lesser booster motor torque to aid the engine torque. The booster thereby shifts its load to engine the speed of which due to the lesser throttle opening and torque is thereby lowered.

If the operator decreases his throttle opening at a time when propeller speed is only slightly below that of engine this will be accompanied by an automatic transition, that is the propeller will pass thru synchronism in this instance to overspeeding in the following manner: A lowering of current in coil 6 causes the magnetomotive force due to current of direction O in coil 7 to predominate and reverse the booster flux changing booster from a motor to a generator, the generated booster current and its torque reaction in combination with the lesser throttle opening and engine torque ability forces a reduction of engine speed to a point where the propeller shaft speed exceeds it.

The control is just as effective when the process is reversed, that is when operator increases his throttle opening in order to accelerate or to take a grade he thereby increases the engine torque. However, my system causes the engine to speed up and develop a power component in addition to that due to increased engine torque which it converts into increased torque at the propeller shaft.

From the foregoing it will be understood that the operator can change the engine and propeller speed and torque relationships by variously depressing his accelerator as the result of which the vehicle is quick to respond, easy and safe to operate requiring no attention for controlling the power flow other than manipulation of the accelerator.

The booster voltage builds up rapidly after transition to overspeeding due to the current increase in coil 7 further aided by the potential of regulator armature 8 in series circuit therewith which tends to flatten out the engine speed characteristic after the vehicle has reached a certain speed. This moderates the engine speed and results in fuel economy and also limits the car speed. If the operator wishes to drive the vehicle at its maximum speed or for other reasons increase engine speed and horse power delivery he depresses accelerator until the switch 24 opens. The resistance 26 being included in the circuit, current in coil 7 is reduced, the lowered booster potential then permits engine to speed up and the greater horse power, changed relationships and increased propeller torque operate to drive the vehicle at its maximum speed.

Figure 2:
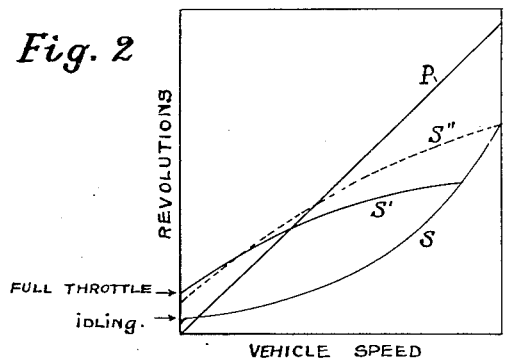
Figures 2, 3, 4, 5 and 6 show respectively the speed, horse power, torque, current and voltage characteristic curves plotted with vehicle speed as abscissas and illustrate the variations caused by changes in the vehicle speed and engine throttle.
Figure 3:
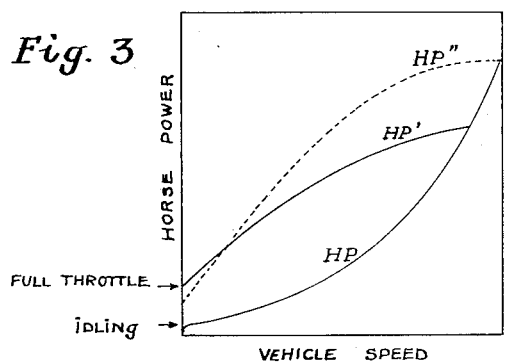
Figure 4:
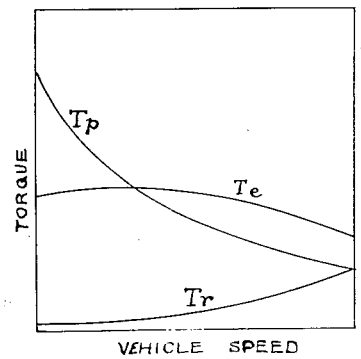
Figure 5:
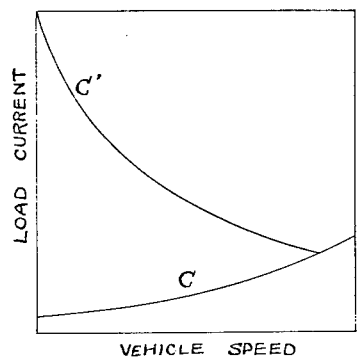
Figure 6:
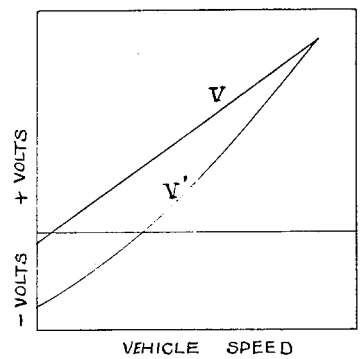

The operation of the system and changing relationships will perhaps be best understood from the characteristics shown in Figures 2, 3, 4, 5 and 6 all plotted with vehicle speed as abscissas. In Fig. 2 the curve P represents propeller speed, S, S' and S'' represent respectively the engine speed under level road conditions, on full load and with accelerator switch open. It shows the range in the engine speed at the disposal of the operator and variation in synchronous speed with respect to vehicle speed as the throttle opening or the load varies. The curves H. P., H. P.' and H. P.'' in Fig. 3 represent engine horse power for level road conditions, full load and with resistance 9 in the circuit illustrating the range in power output of engine resulting from variations in engine speed and throttle opening. Fig. 4 shows difference between road torque $Tr$ and full load engine and propeller torques $Te$ and $Tp$ and particularly, when taken in connection with Fig. 2, that with the vehicle at rest the idling speed produces practically no propeller torque and that a moderate speed increase will build up the propeller torque to its maximum value and greatly beyond the torque ability of engine. Figures 5 and 6 similarly show the road torque and full load currents C and C' and the corresponding voltages V and V' at the brushes of the clutch armature 3, from which it will be seen that the voltage in the main circuit reverses from minus to plus at a higher vehicle speed at full load than at light load.

I wish to call attention to the fact that the excitation for the system is almost entirely furnished by the clutch or booster units themselves the battery and regulator furnishing a relatively very small portion of exciting current in order to stabilize, regulate and to energize the booster during the transition period without the aid of special batteries or other objectional auxiliary devices. The excitation of the system is furnished entirely by the clutch during the underspeed period, by the clutch booster and regulator during the transition period and by the booster and regulator when overspeeding. Furthermore as heretofore mentioned my system will charge the battery 14 and supply current to the devices customary in motor vehicles such as the ignition coil 16, light 35 and horn 36 which are connected to regulator armature 8 thru the resistance 17 or thru the cut out switch 37 when the regulator potential reaches the desired value. The resistance 38 is provided in order to adjust the relation between the potential impressed by the regulator upon the battery and the booster coil 7. It should also be noted that the vehicle translating devices and battery although tied in with the transmission units are arranged in such a way that the great difference in their voltages does not interfere with their respective operations. Furthermore my system, by reason of the stabilization provisions and mode of regulation, permits the use of a combination of field windings on clutch and booster which materially aids its electric and weight efficiencies. It will be appreciated that the series field winding on clutch is capable to produce great magnetic density and to economically exert a very powerful torque on the armature 3 and propeller shaft at start. The core currents aid to produce torque when propeller underspeeds and serve to minimize the current in main circuit. When overspeeding the load current has greatly descreased, even with full throttle opening, density and core currents have also greatly decreased resulting in moderate core losses. The changed clutch field density further increases the range of automatic variation heretofore described. During the underspeeding period the booster operates as a compound motor the two coils 6 and 7 cooperating to produce the maximum torque which is of importance as the current density in the windings at this time is high. Again during the transition period current and loss in coil 7 are zero or nearly so, the booster operating as a series motor. Due to the fact that coil 6 is not depended on alone for maximum torque at start, it need only be provided with relatively few turns to effect the desired booster flux change as the throttle opening is varied and due also to the moderate current therein during this period the loss is small.

My system is also operative to electrically retard the vehicle and to limit its speed on down grades, making use of engine friction for this purpose. When operator closes switch 39 a circuit that shunts the armature 3 thru resistance 40 is established which prevents the counter potential of clutch from opposing booster, the idling engine generating sufficient booster potential to send a current thru resistance 40 and field coil 2 thus energizing clutch, the overrunning armature 3 has a current generated in it reversely to arrow which joins the booster current thru resistance 40 and drags the field coil 2 and engine with it, the higher engine speed strengthens the clutch field and current in armature 3 and so builds up a substantial braking action a part of the energy being dissipated in engine friction and another part in resistance 40.

From the foregoing it will be seen that my system is efficient and of moderate weight. It starts the engine from a standard battery, charges the battery and supplies current for other purposes, it transmits and controls the engine power automatically and safely with a minimum of attention from the operator.

Reference is herewith made to the following of my copending applications:

Serial #219,227 filed Sept. 13, 1927 contains the broad claims for energizing and controlling an electric system.

Serial #292,194 filed July 12, 1928 contains the broad claims for the combination of a regulating dynamo for charging a battery and regulating an electric system.

Serial #219,226 contains the broad claims for variously energizing a shunt field coil on one of the dynamos, and for starting the engine from a battery.

While I have herein shown a complete electric system embodying my invention and described its operation in connection with a motor vehicle I desire to have it understood that my invention is adopted for other uses such as hoists and that it may be used in whole or in part in the described or other embodiments within the principle and scope of my invention.

Having described my invention what I claim and desire to secure by Letters Patent is:

1. In combination, an engine shaft, a load shaft, a dynamo rotatively connected with both shafts, a second dynamo rotatively connected with one of the shafts and having a shunt field coil, a load circuit including the dynamos, a battery, and an exciting circuit including the shunt field coil, battery and one of the dynamos adapted to circulate current thru the shunt field coil in a given direction in one stage of operation and to circulate current thru the shunt field coil in reverse direction in another stage of operation.

2. In combination, an engine shaft, a load shaft, a dynamo rotatively connected with both shafts having a field element and a field winding with relatively many effective series field turns per pole, a second dynamo rotatively connected with the engine shaft having a field element and a field winding with a lesser number of effective series field turns per pole with respect to the field winding of first dynamo, an auxiliary field coil for the second dynamo, means for circulating current thru the auxiliary field coil in a given direction, and means for reversing the current in the auxiliary field coil.

3. In combination, an internal combustion engine having a shaft and a throttle mechanism, a load shaft, a dynamo rotatively connected with one of the shafts having a field element and a field coil, a second dynamo rotatively connected with both shafts, a load circuit including the dynamos, a resistance, an exciting circuit including the field coil and the resistance, and a switch operative by the movement of the throttle mechanism to vary the resistance of the exciting circuit and to reverse the magnetic flux in the field element.

4. In combination, an engine shaft, a load shaft, a dynamo rotatively connected with one of the shafts having a field coil, a second dynamo rotatively connected to both shafts, a load circuit including the dynamos, an auxiliary generator, an exciting circuit including the field coil, auxiliary generator and one of the dynamos, a battery, an electromagnetic switch adapted to connect the battery to the auxiliary generator, and means for varying the speed of the auxiliary generator.

5. The means for variously operating a load and an internal combustion engine which includes a load shaft, an engine shaft, a dynamo rotatively associated with both shafts, a second dynamo operatively connected to one of the shafts and having a shunt field coil, a variable voltage auxiliary generator connected to the field coil, a battery, a resistance adapted to connect the battery with the field coil and auxiliary generator, and a switch adapted to shortcircuit the resistance.

6. In combination, an engine shaft, a load shaft, a dynamo rotatively connected with one of the shafts having a shunt field coil, a second dynamo rotatively connected with both shafts, a load circuit including the dynamos, an auxiliary generator, a battery, and means for supplying the shunt coil with current from one of the dynamos in one stage of operation, from the battery in another stage and from the auxiliary generator in still another stage.

7. In combination, a vehicle having an engine shaft, a load shaft, a dynamo rotatively connected with both shafts, having a field coil, a battery, and a switch operative in one position to connect the battery with the dynamo and to rotate engine shaft and in another position to shortcircuit the field coil.

8. In combination, a vehicle having an engine shaft, a load shaft, a brake mechanism, a dynamo rotatively connected with both shafts having a field coil, a battery, a two-position starting switch, a control switch adapted to be operated by said brake mechanism, conductor connections between the dynamo, battery and switches adapted to rotate engine shaft with battery current when starting switch is in one position and vehicle brakes are locked, to shortcircuit the field coil when starting switch is in the other position, and to open the shortcircuit when vehicle brakes are released.

9. In combination, a vehicle, an engine having a shaft, a load shaft, a dynamo rotatively connected with the engine shaft having a field coil, a second dynamo rotatively connected with both shafts, a load circuit including the dynamos, a battery, an ignition coil for the engine, and switching means when moved to one position to connect the battery with the ignition coil and with the field coil and when moved to another position to disconnect the battery from the ignition coil and from the field coil.

10. In combination, an engine shaft, a load shaft, a dynamo rotatively connected with both shafts having a field element and a field winding with relatively many effective series turns per pole, a second dynamo rotatively connected with the engine shaft having a field element and a field winding with a lesser number of effective series field turns per pole with respect to that in the first dynamo adapted to increase load shaft torque with respect to engine shaft torque, an auxiliary field coil for the second dynamo, a source of potential connected to the auxiliary field coil, and means for varying the potential impressed on the auxiliary field coil operative to reverse the magnetic flux in the field element of the second dynamo.

11. In combination, an engine having a shaft, a load shaft, a dynamo rotatively connected with both shafts having a field coil, a second dynamo rotatively connected with engine shaft, means including a battery for starting the engine, an auxiliary generator, an electromagnetic switch for connecting the generator with the battery and a switch for short-circuiting the field coil operative to control power flow between the shafts.

12. In combination, an engine shaft, a load shaft, a dynamo rotatively connected with both shafts, a second dynamo rotatively connected with one of the shafts having a field coil, an auxiliary generator connected to said field coil, a storage battery, a resistance, an exciting circuit including the field coil, storage battery and resistance, and an electromagnetic switch operative to short-circuit said resistance.

13. In combination, a vehicle having electrical auxiliary devices, an engine having a shaft, a load shaft, a dynamo rotatively associated with both shafts, a second dynamo cooperating with the first dynamo for transmitting power between the shafts, a battery for energizing one of the dynamos, a regulating generator for controlling the dynamos, and means for connecting the regulating generator with the battery and with the auxiliary devices.

14. The means for braking a load and reversing the power flow between an engine and a load which includes a vehicle having an engine and an engine shaft, a load shaft, a dynamo rotatively associated with one of the shafts, a second dynamo rotatively associated with both shafts having an armature and a field coil, a load circuit including the dynamos, and a switch connected to the armature and the field coil, operative when in one position to permit mechanical power flow from engine shaft to load shaft for accelerating the vehicle and when in another position to permit mechanical power flow from load shaft to engine shaft for decelerating the vehicle with the aid of engine friction.

Signed at Newark, in the county of Essex and State of New Jersey this 10th day of July, A. D. 1928.

ALFONS HENRY NEULAND.